R. C. ELLIOTT.
PATTERN OR RECORD STRIP COMPOSING MACHINE.
APPLICATION FILED JAN. 4, 1910.
989,589.
Patented Apr. 18, 1911.
3 SHEETS—SHEET 2.
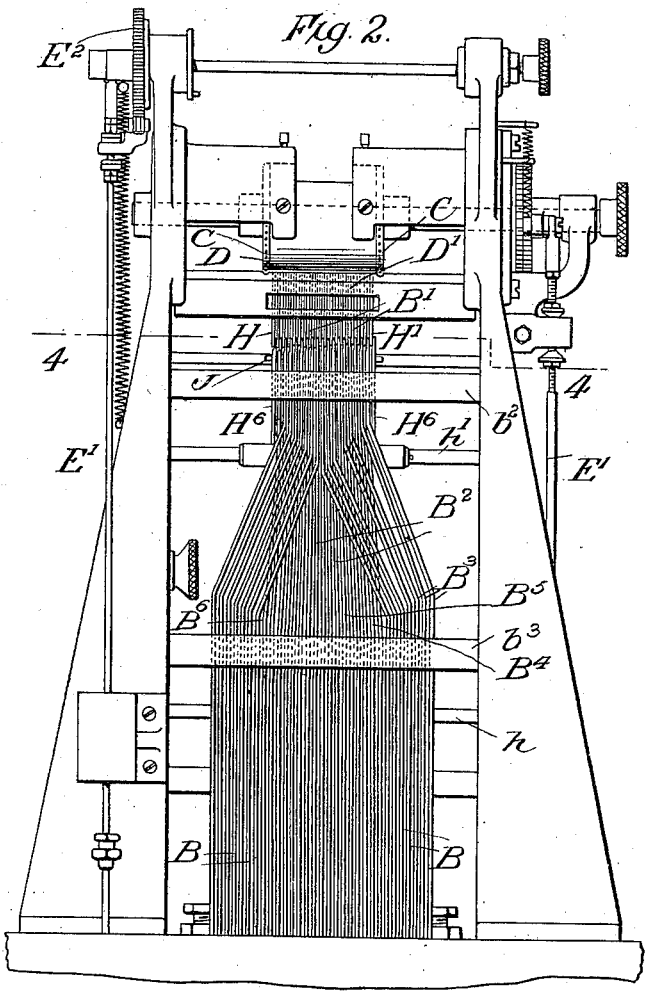
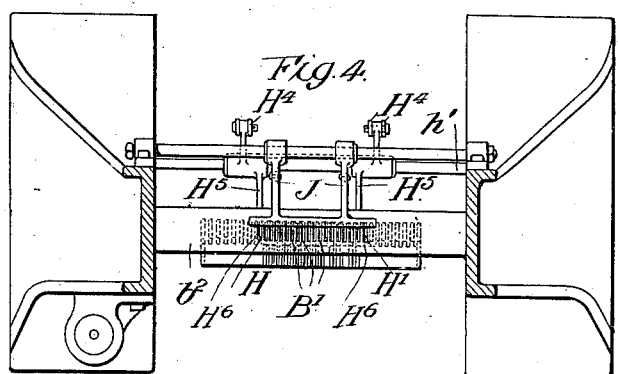

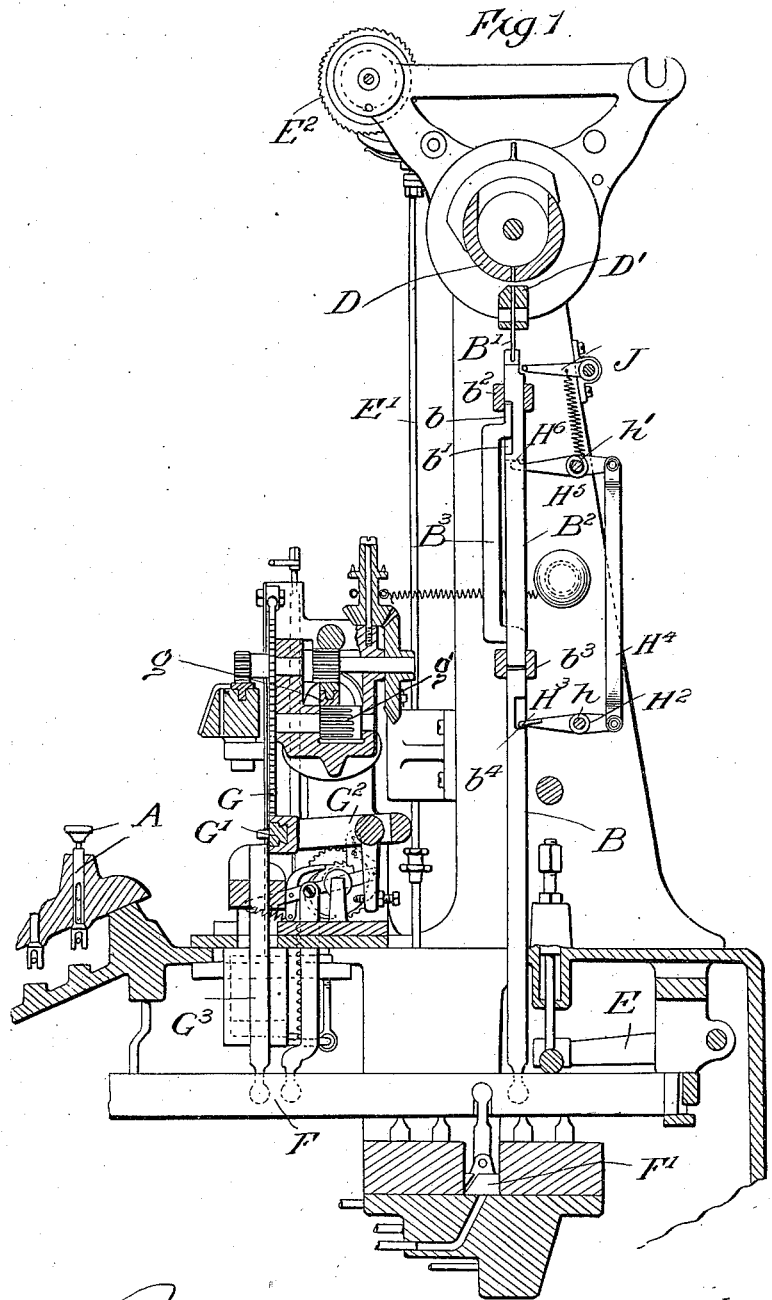

R. C. ELLIOTT.
PATTERN OR RECORD STRIP COMPOSING MACHINE.
APPLICATION FILED JAN. 4, 1910.
989,589.
Patented Apr. 18, 1911.
3 SHEETS—SHEET 3.
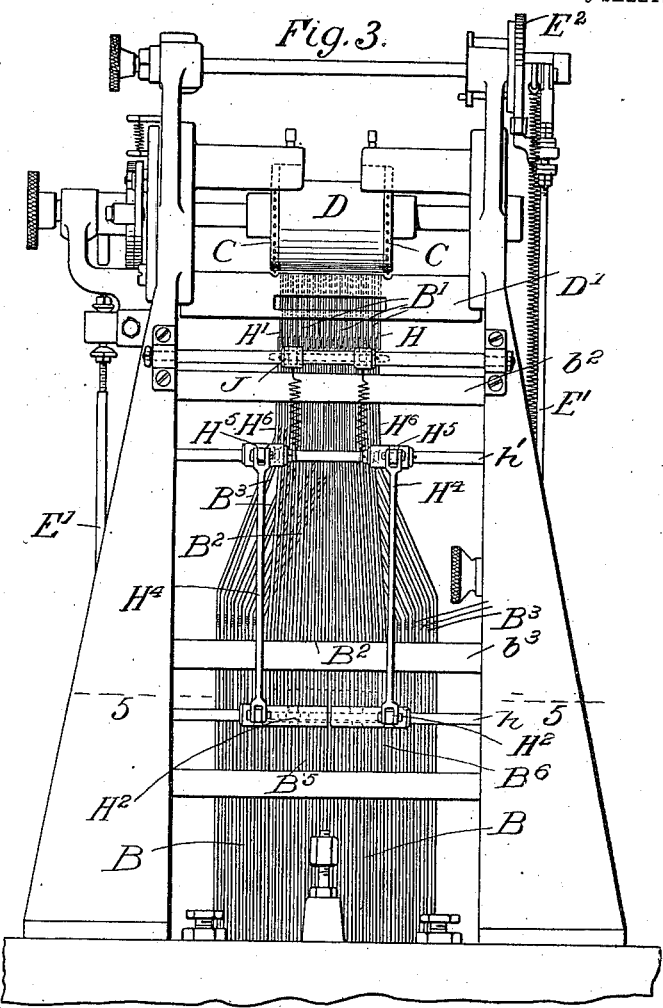
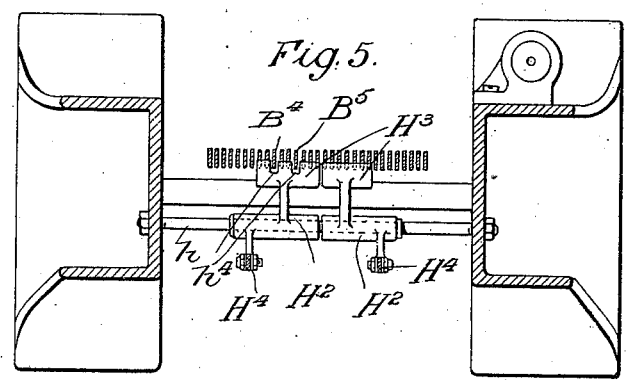
Witnesses
Thomas Durant
Inventor
R. C. Elliott
by Church & Church
his Attorneys

UNITED STATES PATENT OFFICE.

RICHARD CORNELIUS ELLIOTT, OF CLAPHAM, LONDON, ENGLAND, ASSIGNOR TO LANSTON MONOTYPE MACHINE COMPANY, OF PHILADELPHIA, PENNSYLVANIA, A CORPORATION OF VIRGINIA.

PATTERN OR RECORD-STRIP COMPOSING-MACHINE.

989,589. Specification of Letters Patent. Patented Apr. 18, 1911.

Application filed January 4, 1910. Serial No. 536,315.

*To all whom it may concern:*

Be it known that I, RICHARD CORNELIUS ELLIOTT, a subject of the King of Great Britain, residing at 18ª Cato road, Clapham, London, England, have invented a certain new and useful Improvement in Pattern or Record-Strip Composing-Machines; and I do hereby declare the following to be a full, clear, and exact description of the same, reference being had to the accompanying drawings, forming a part of this specification, and to the figures and letters of reference marked thereon.

This invention relates to type composing or character designating systems, machines or apparatus and refers particulary to those involving two separate composing operations, the one manual, for the production of a pattern, record-strip or controller, and the other automatic and governed by the said pattern, to translate the signals thereof into, or effect the production of, justified lines of typographic matter.

The pattern, record-strip or controller generally employed comprises a strip or ribbon of paper or other flexible material in which are produced or formed, by the manually operated composing machine, a succession of signals each denoting a character, space or sign to be produced, or an operation to be performed by the automatic composing machine. After composition, this pattern or record-strip is fed to, and controls the operations of, the automatic composing machine which latter is provided with mechanism responsive to the signals and operating to select the individual characters or symbols and spaces, and determine the operations required for the production of the typographic matter.

Each character, space, point or other symbol in a font is represented in the manual composing or record-strip preparing machine by a key, and in the automatic composing or type-casting machine by a matrix.

The keys of the record-strip preparing or composing machine, through appropriate permutation and transmission mechanisms or system control signal producing devices such as punches or drivers, each complete signal including one or more perforations, depressions or projections by which the mechanisms of the automatic or pattern-controlled character producing or casting machine are controlled, to position, by a two-way movement, a die-case or its carrier over the casting or impression point. The matrices in this die-case are arranged symmetrically in columns and rows running at right angles to each other, each column generally containing characters of the same width, setwise, and each row, characters which in their setwise dimension increase progressively from one end of the row to the other.

The signal producing devices are usually disposed in line, and divided, conveniently, into two groups, one group representing successive rows and the other group successive columns of matrices; and the keys are connected with the signal producing devices in a manner to produce the proper combination of signal components, one representing a particular column and one a particular character in that column or a particular row, the character to be selected being located at the point of intersection of a column and a row.

The signal producing devices representing the various columns of characters as they are arranged in the die-case, produce signal components in the record-strip which control, in the record-strip controlled machine, mechanism comprising a series of separately operable gages upon which acts a translating or centering mechanism connected with the die-case to move it in one direction. Similarly the signal producing devices representing rows of characters produce signal components controlling similar gages and positioning or translating mechanisms connected with the die-case carrier, to move the die-case in another direction.

According to the systems most commonly employed the signal producing devices are, preferably, punches which perforate the pattern strip, each punch representing only one row or column. A complete signal, comprising a particular combination of perforations, representing therefore only one matrix or only one stopping place of the die-case in each of its two movements of adjustment.

Now, according to the present invention, which refers to the manually controlled record-strip, or pattern preparing or composing machine, each punch or signal producing device is caused to represent a plurality of columns or a plurality of rows according to which group it is situated in, and each complete signal in the record-strip controls a plurality of gages or a plurality of combinations of gages in the automatic composing machine, and thereby a plurality of stopping places or matrices. By this invention, therefore, for dealing with a particular font the number of punches required is only half the number necessary in already known systems, and, together with the reduction of the number of punches, there is effected a corresponding reduction in width of the record-strip. The punches being arranged in line, the record-strip must be wide enough to extend over the entire surface occupied by the ends of the punches, and since the record-strip once perforated cannot be re-perforated or re-composed for other matter, it represents so much waste after passing through the automatic composing machine, thus constituting a considerable item of outlay in the course of time. The number of punches being reduced, as stated, the width of the record-strip and, therefore, its initial cost is considerably decreased by the present invention.

In accordance with the present invention, the punches or signal producing devices of the manual composing machine are each operatively connected with two, or it may be more, actuating members or bars; that is to say, with two or more members denoting columns or rows and between which and the operating keys the permutation system or selecting mechanism is disposed.

In addition to the positioning or character designating signals or perforations there are employed one or more pilot or selecting signal components produced by one or more designating or pilot punches or signal producing devices which are separate from the series of positioning or selecting punches, but are arranged to automatically coöperate with one or some of the actuating members of each designating signal producing device. These pilot-signal producing devices being automatically operated with and by the actuating members for the designating signal devices require no special act or separate attention on the part of the operator of the machine.

An example of the systems above referred to is set forth in Patents No. 654,115 of July 17, 1900, and No. 625,998 of May 30, 1899, which refer, respectively, to the manually operated machine for composition of the pattern, record-strip or controller; and the automatic pattern or record-strip controlled composing machine for the production of justified lines of type or typographic matter.

The machines according to this system provide for fonts having two hundred and twenty-five characters, stops, points, or like symbols, each of which is represented in the casting machine by a matrix and in the manual composing machine by a key in the record strip preparing or composing machine. In the die-case of the casting machine the matrices are arranged in fifteen rows running in one direction and fifteen columns running in the other direction. Each column of matrices is represented in the pattern composing machine by a punch in one of the two groups, each row being similarly represented by a punch in the other group.

In addition to the two hundred and twenty-five character designating keys there are two additional rows of fifteen keys each which act on the punches making a total of two hundred and fifty five designations, including in addition to the character row and column punches, designations for setting the justifying mechanisms of the casting machine. The perforations for these justifying mechanisms are made by some of the punches already referred to, with the addition of a justifiable space-denoting punch and two justification designating punches.

It is to be noted that in this particular machine the extreme advance movement of the die-case in its column selecting and row selecting directions can be and is determined by fixed stops. Therefore, for the column of characters along one side of the die-case it will only be necessary to provide a perforation to select the particular matrix in the column, and, on the other hand, if the desired matrix is in one of the extreme rows, no perforation for that row will be required but only one for the column in which the matrix is located. Because of this, it is not necessary to provide a punch for indicating one of the extreme columns nor a punch for indicating one of the extreme rows. Briefly, the positioning of the die-case for centering any one of the two hundred and twenty-five matrices and for effecting the operation of the justifying devices has hitherto required thirty-one punches allocated as follows: fourteen punches representing progressive degrees of adjustment for the die-case in one direction; another fourteen representing similar degrees of adjustment for the die case in a direction transverse of the first mentioned; of the remainder, two punches represent the justification designating signals and the final one represents the justifiable space.

Now, according to the present invention a record-strip or pattern, constituting the controlling element of the casting or type-producing machine, is prepared or composed to govern the same number of stopping places, or center the same number of dies and control the same number of adjustments of the justification devices with the employment of only half the number of character-designating or column-and row-selecting punches, namely, fourteen, each of which, as already stated, is now capable of being operated by a plurality of, preferably two, actuating members or punch bars.

The keys, through a permutation system, govern the proper combination of punch bars each connected hitherto to its respective punch, and according to the present invention there is provided for each punch a plurality of interponents connecting each punch with a similar plurality of punch bars, and there is also provided a plurality of pilot or guide punches, preferably one for each group of punches or punch bars, the pilot punches being adapted to be operated by and simultaneously with one of the plurality of punch bars by which each punch is operated. The perforations produced by these pilot or guide punches are adapted to control a shift mechanism in the automatic or pattern controlled casting machine by which the action of a column or row selecting punch is transferred from one gage to another, whereby the same row or column selecting perforation serves for two different rows or columns and thus for two gages or two different positions of the die-case.

The justification punches and the justifiable space punch remain as hitherto, and thus the total number of punches is now:— fourteen character designating punches arranged conveniently in two groups of seven each; a justifiable space punch; two justification designating punches, and two pilot or selecting punches, nineteen in all.

Referring now to the accompanying drawings illustrating a preferred form of embodiment of the invention, Figure 1 is a sectional side elevation of a well known record-strip or pattern preparing or composing machine with the present invention shown applied thereto. Fig. 2 is a front elevation of part of the machine shown in Fig. 1. Fig. 3 is a rear elevation of Fig. 2. Fig. 4 is a section on the line 4—4, of Fig. 2 and Fig. 5 is a section on the line 5—5, of Fig. 3.

The same reference letters indicate corresponding parts throughout the drawings.

The pattern or record-strip preparing or composing machine to which the present invention is shown applied is that forming the subject-matter of Letters Patent No. 654,115, already referred to. It is not necessary to give herein a detailed description of the construction and operation of this machine; it will be sufficient to refer to those parts coacting with, or more intimately related to, the mechanism forming the subject of the present invention. For example, the valved finger keys A which are arranged in column and row series and denote the various characters of the font; the punch actuating bars or punch bars B; the pin wheels C of the paper feed; the curved die or tracker bar D around which the record-strip passes; the punch guide bar D'; the rocking frame E extending across the punch levers F and connected with a rod E' which controls the paper feed; the units wheel G to which motion is imparted by a motor-operated rack $g$ gearing with pinion $g'$ on the units wheel shaft; the motors F' each connected to a punch lever F and controlled singly or in multiple by the keys A; the units rack G' mounted in a rocking carrier $G^2$ and adapted to engage the units wheel; and the unit stops $G^3$ each connected to the members of one group of the punch levers and projected by them into the path of the units rack.

Of the thirty-one punch bars represented in Fig. 2, three—$B^4$, $B^5$ and $B^6$,—correspond with the justifiable space punch, and the major and minor justification designating punches, while the remaining twenty-eight are divided with two series of fourteen each, corresponding, respectively, to the punches representing columns and rows in the die-case. The thirty-one punches of the prior machine are thus reduced to nineteen, including the justifiable space and two justification punches, as before, and two series of eight punches each representing columns and rows, respectively.

Each series of fourteen punch bars B representing columns or rows is sub-divided into two groups of seven each and is coupled with one of the series of eight punches in the manner about to be described.

As the connections are the same between each series of punch bars and the complemental series of punches, an explanation of one will serve for both.

The members of one group of punch bars, seven in number, are individually coupled with one of the punches pertaining to that series through an interponent $B^2$ to which the punch is coupled, said interponent resting upon and being engaged by its punch bar, to project the punch whenever said bar is operated. The remaining seven punch bars, constituting the other or second group, are each coupled to one of the punches pertaining to the first group through an interponent $B^3$, the latter resting upon and being engaged by its punch bar and in turn engaging one of the same series of punches controlled by the interponents $B^2$. In the example such engagement is brought about by providing each interponent $B^3$ with an offset or shoulder $b$, riding in a guide or socket $b'$ in one of the interponents $B^2$ and contacting with a shoulder or abutment thereon. By this arrangement it will be seen a plurality of punch bars, one of each group, is rendered independently operable upon each one of seven of the series of eight punches pertaining to the same series of punch bars.

The eighth punch H (or H') of the series is what is termed the pilot, in that in the automatic composing machine, of which an example is illustrated in an application Serial No. 536,314, filed concurrently herewith, the perforation or signal component produced thereby when associated with the perforation produced by any of the seven punches of the same series changes the value or significance of the latter or of the produced signal perforation. Thus, a perforation produced by any one of the seven punches B' of the column or row series represents one value when standing alone and another value when associated with the pilot signal, and in this way the seven punches of each series can be made to produce the fourteen signals for column or row in the die-case. For example, assuming that the first fourteen punch bars B on the left in Fig. 2 each represents one of the fourteen columns of the die-case, the first seven controlling interponents $B^3$ will operate the corresponding punches B' to indicate the first seven positions of the die-case, and the remaining punch bars controlling interponents $B^2$ the same series of punches would designate like positions of the die-case but for the presence of the pilot perforation produced by punch H, the latter operating to change the assigned value of the perforations and so represent the eighth, ninth, and so on, up to the fourteenth column of the die-case.

The sockets $b'$ in the interponents $B^2$ are elongated so as to permit these interponents to rise without carrying the corresponding interponents $B^3$ with them, and the interponents $B^2$, $B^3$, are maintained in position and in line with the punch bars, by combs or bridges $b^2$ $b^3$. To secure the coöperative action of the pilot punch H (or H') with one group in the series of punch bars designating column or row, it may be controlled or actuated by the interponents pertaining to such group or from the punch bars. A convenient mechanism for thus actuating each of the pilot punches consists of frames $H^2$, one for each pilot punch, fulcrumed upon a shaft $h$ secured to the paper tower. The front bar $H^3$ of these frames rests upon shoulders or offsets $b^4$ provided on each bar of the group of punch bars adapted to actuate the pilot punches, and on the opposite side of the shaft each frame is connected by an upwardly extending link $H^4$ to the outer end of a lever $H^5$ pivoted to the paper tower at $h'$ with its inner end resting beneath a short bar $H^6$ carrying the pilot punch H (or H').

The punch bars B are returned by the bar E and the interponents are returned by a spring controlled lever J which is pivoted to the paper tower and bears upon shoulders on the interponents, or the bar J may be controlled by a motor in open communication with the pneumatic system of the machine.

If the compositor of the pattern strikes, for example, the key representing a character located in the second column and the fourth row, the second punch of the column selecting punches and the fourth punch of the row selecting punches will be operated and no pilot will be actuated. The perforations so formed will act upon the second column selecting gage and the fourth row selecting gage in the casting machine. The same two punches will be operated by a key representing a character situated in the ninth column and fourth row of the die-case, but in this instance the column pilot punch H will be operated and a shift mechanism in the casting machine actuated to transfer the effect of the column signal from the second to the ninth gage of the column selecting series. Again, the same two punches will be operated when a key is touched denoting a character in the second column and eleventh row, in which case the row-pilot punch H' will be actuated. Yet again, the same two punches will be operated by the depression of a key denoting a character situated in the ninth column and the eleventh row, in which case both the column and row together with the two pilot punches H H' will be actuated.

The stops $G^3$ of the unit-counting mechanism are not interfered with by the mechanism according to this invention, and when employed on a machine such as forms the subject of Letters Patent No. 883,376 of March 31, 1908, the stop bars $G^3$ will be connected to the punch bars B below the level of the interponents $B^2$ $B^3$.

The three punch bars $B^4$ $B^5$ $B^6$ operate the space and justification punches and are arranged as in the existing machine except that for convenience the bars are formed in two parts, as shown, and the bars $H^3$ are slotted or cut away at $h^4$ (see Fig. 5) so as not to interfere with or be operated by these punches.

Having thus described my invention what I claim as new and desire to secure by Letters Patent, is:—

1. In a pattern composing machine, the combination of the following elements, to wit; a series of punch bars divided into groups; a series of punches; interponents connecting the punch bars of one group with a corresponding number of punches; interponents connecting a different group of punch bars with some or all the punches controlled by the first named group of punch bars; and means for coupling one group of punch bars with a separate or pilot punch pertaining to said series of punches.

2. In a pattern composing machine, the combination of the following elements, to wit; a series of signal selecting members of progressively increasing values; a plurality of signal producing devices each connected with and separately controlled by a plurality of the signal selecting members; a designating or pilot signal producing device associated with the first named signal producing devices; and means for actuating said designating or pilot signal producing device in conjunction with one of the plural signal selecting members controlling the same signal producing device, to change the value of the produced signal.

3. In a pattern composing machine, the combination of the following elements, to wit; a graded series of signal selecting members; a plurality of signal producing members each connected with and under the separate control of a plurality of said signal selecting members; a designating signal producing member associated with the first named signal producing members; and means for automatically actuating said designating signal producing member in conjunction with one of each set of signal selecting members having a signal producing member in common.

4. In a pattern composing machine, the combination of the following elements, to wit; two graded series of signal selecting members, each series divided into groups; a series of signal producing members less in number than either of said series of signal selecting members and separately controlled by the members of each group of both series; and two designating signal producing members, one for each series of signal selecting members, associated with the first named series of signal producing members, each of said designating signal producing members being coupled to act in conjunction with the individuals composing one group of signal selecting members pertaining to the same series as said designating signal producing member.

5. In a pattern composing machine provided with a series of signal selecting members or punch bars, and in combination therewith, a series of signal producing members or punches each coupled with and separately controlled by a plurality of said signal selecting devices, a designating signal producing member or punch associated with said first named signal producing devices, and means intermediate the signal selecting members and said designating signal producing member for automatically actuating the latter in conjunction with one of the signal selecting devices controlling each of the first named signal producing members.

6. In a pattern composing machine, the combination of the following elements, to-wit; a series of selectively controlled punch bars comprising two groups; a series of punches equal in number to the members of one of said groups of punch bars; transmitting devices or interponents coupling a plurality of punch bars, one of each group, with each of said punches; and a designating punch associated with said first named series of punches and controlled by the members of one group of punch bars.

7. In a pattern composing machine provided with a series of punches and a series of punch bars exceeding in number the punches, and in combination therewith, a series of interponents each carrying one of said punches and engaging one of a group of punch bars; a second series of interponents each engaging one of the first named series of interponents and a punch bar of a different group; a pilot or designating punch; and actuating devices for the last named punch controlled by the punch bars of the group connected to one series of interponents.

8. In a pattern composing machine provided with a series of selectively controlled members or punch bars, and in combination therewith, the following elements, to-wit; a series of punches; a series of interponents one for each punch and interposed between the latter and one of the punch bars; a second series of interponents each interposed between and engaging a punch bar and one of the first named interponents, thereby establishing an operating connection between each punch and a plurality of punch bars; a pilot or designating punch associated with the first named series of punches; and actuating means for said pilot punch, the same including a transmitting member in position to be engaged by any one of the punch bars coupled with one of said series of interponents.

RICHARD CORNELIUS ELLIOTT.

Witnesses:
F. L. RAND,
H. D. JAMESON.

---

Copies of this patent may be obtained for five cents each, by addressing the "Commissioner of Patents, Washington, D. C."